(12) United States Patent
Romero et al.

(10) Patent No.: US 12,260,479 B2
(45) Date of Patent: Mar. 25, 2025

(54) SYSTEM AND METHODS OF MANIPULATION OF SHAPE ELEMENTS USING EDGE PARAMETERS

(71) Applicant: Tile Farm LLC, Albuquerque, NM (US)

(72) Inventors: Louis Anthony Romero, Albuquerque, NM (US); Julian Neukom Romero, Tucson, AZ (US); Alexander Charles Romero, Los Angeles, CA (US); Aaron Michael Johnston, Albuquerque, NM (US)

( * ) Notice: Subject to any disclaimer, the term of this patent is extended or adjusted under 35 U.S.C. 154(b) by 279 days.

(21) Appl. No.: 18/145,272

(22) Filed: Dec. 22, 2022

(65) Prior Publication Data
US 2024/0212241 A1    Jun. 27, 2024

(51) Int. Cl.
*G06T 11/20* (2006.01)
*G06F 3/04845* (2022.01)
*G06T 11/60* (2006.01)
*G06V 10/44* (2022.01)

(52) U.S. Cl.
CPC .......... *G06T 11/60* (2013.01); *G06F 3/04845* (2013.01); *G06V 10/443* (2022.01)

(58) Field of Classification Search
CPC . G06T 11/20; G06T 11/60; G06T 2219/2004; G06T 2219/2021; G06F 3/04845; G06F 30/00; G06F 30/10; G06F 30/12
See application file for complete search history.

(56) References Cited

U.S. PATENT DOCUMENTS

| | | | | |
|---|---|---|---|---|
| 7,782,322 B2 * | 8/2010 | Setoguchi | .............. | G06T 17/00 345/442 |
| 11,232,237 B2 * | 1/2022 | Faeth | ..................... | G06F 30/12 |

* cited by examiner

*Primary Examiner* — Hau H Nguyen

(57) ABSTRACT

A system comprising a shape element library and a set of tools and scripts enabling, via manipulation of shape element parameters in a primarily graphical setting, the graphical attachment and multiplication of shapes elements to form shape element clusters.

7 Claims, 7 Drawing Sheets

E= Edge l= Edge length n= normal m= midpoint

E= Edge
l= Edge length
n= normal
m= midpoint

SYSTEM AND METHODS OF MANIPULATION OF SHAPE ELEMENTS USING EDGE PARAMETERS

SUMMARY

The system and methods described here are directed to a platform enabling the visualization and design of shapes in the fields of architecture, engineering, product development, and education, although other fields may also benefit from the use thereof. In particular, shapes are manipulated in the form of shape elements, which will be described below. The system may comprise a set of software applications, online and/or offline platforms, and websites (collectively, "system platforms"). The system may additionally comprise a set of processors connected over a network, with the processors configured to run the system platforms. The processors may be implemented in traditional computers, such as desktops, laptops, specialized computing devices, servers, or mobile computers such as smart phones, tablets, and the like. The system may comprise a set of input devices, such as a mouse, keyboard, touch screen, and/or virtual/augmented reality devices, with the set of input devices connected to the processors and configured to enable users to interact with the system platforms. The system may comprise one or more display devices, such as screens, monitors, and virtual/augmented reality glasses/headsets and the like, with the display devices configured to display user interfaces of the system platforms to facilitate user interaction with the system platforms.

The system platforms comprise a shape library, with the shape library comprising a set of shapes elements and geometrical information for each shape element, with the shape elements including triangle, square, hexagon, trapezoid, parallelogram, rhombus, other symmetrical or asymmetrical polygons, or any shape that has at least one flat side. The geometrical information may include a number of sides or "edges", an identification reference for each edge, a number of angles, an identification reference for each angle, an orientation or arrangement of each edge and angle with respect to other edges and angles, and a color. The edges, connected at indicated angles, form a main body of a shape element, with the shape element possessing an indicated color. The geometrical information may also include an edge length, a midpoint of an edge, and a normal of an edge, with the normal having a directionality indicating the orientation of the edge vis-à-vis the main body of the shape element.

The user interface may comprise a work station, a shape element station, and a manipulation tool station. Each station may comprise graphical data enabling a user to visualize components and features of the system platforms. The stations may be relationally fixed, such that each station has an unchanging location on the user interface, or they may be relationally modular, such that a first station occupies a first portion of the user interface at a first time, but then a second station occupies the first portion at a second time, etc. In one variation, the stations can be moved about the display device via manipulations received by the user via the input devices, including the use of drag-and-drop and snap-to-position graphical mechanisms.

The shape element station, also referred to as a "dock", may be configured for displaying and enabling a user to select one or more shape elements from the shape element library. The shape element station may be scroll-actuated in order to display shifting subsets of shape elements from the shape element library. Shape elements selected may be moved, positioned, or otherwise directed to appear in the work station. When a shape element appears in the work station, it may be referred to as an "active shape element". The position of active shape elements in the work station vis-à-vis the other active shape elements may be determined via edge manipulation, as will be described.

The display space that comprises the work station may be modified via zooming, panning, and rotation mechanisms, as indicated via input device manipulations. In one variation, the display space as well as the shape elements are two dimensional. In another variation, the display space and shape elements appear three dimensional, although manipulation of shape elements is only permitted across two dimensions. In yet another variation, the display space and shape elements may be viewed and manipulated across three dimensions of length, width, and height. Thus, rotation may occur around a fixed point in two dimensions, or may encompass three dimensions of rotation around that fixed point. Repositioning of active shape elements may result in the active shape elements being positioned further or nearer the fixed point and at a given angle around that fixed point, as directed by the user. In one variation, the display space is subject to perspective, such that shape elements further away appear smaller than shape elements closer to a point of view encompassing the work station. Active shape elements within the display space may be moved within the display space relative to other active shape elements or other landmark features, such as axes or graph lines and the like. The landmark features may be visible, non-visible, or may shift in visibility depending on the actions of the user or the activity, status, or state of the system platforms.

The manipulation tool station may be configured for displaying and enabling a user to select one or more graphical tools, with the graphical tools configured to manipulate active shape elements positioned in the work station ("graphical manipulation"). Graphical tools may include mechanisms to change the color and size of active shape elements displayed or tentatively displayed in the work station. Mechanisms for color change may include a sliding color gradient bar and color tiles, with a position of a sliding toggle on the sliding color gradient and/or the selection of a color tile configured to accordingly change the color of the shape element.

Active shape elements may be connected via edge manipulation (also called "attachment"). During attachment, the user indicates the selection of an edge of the active shape element via the input devices. Actuation of the edge, which may occur via an appropriate input device manipulation, may cause an additional shape element to appear adjacent to and/or touching the selected edge. In particular, attachment involves the edge of the additional shape element being positioned adjacent to and/or touching the selected edge. Attachment may also occur by a first selection of the additional shape element followed by a subsequent selection of an edge of an active shape element. Selection may occur by moving a cursor toward an edge and indicating it by hovering over the edge, actuating an input device such as a button, or by any other appropriate means; further, the selection may occur prior to a selection of the additional shape element, such that the selection of the edge is initially "empty" of the additional shape element, or after the selection of the additional shape element, such that the selection of the edge is "loaded" with the additional shape element. Finally, selection of an edge may not necessarily require "touching" the edge, but may rather be sufficiently indicated via a sufficient proximity to the edge, or by virtue of being closer to the selected edge than any other potentially selectable edge, whether of the same active shape element or a different active shape element.

Shape elements subject to attachment may be identical shape types, sizes and colors, or may differ in shape types, sizes, or colors. In one variation, the size of the additional shape element is modified automatically so that the edge of the additional shape element is coterminous with an edge of the active shape element to which the additional shape element is being attached. In this variation, as an example, if the active shape element is an isosceles triangle (and not an equilateral triangle), the additional shape element will appear to increase or decreases in size as an edge of the additional shape element is brought closer to, respectively, longer or shorter edges of the isosceles triangle.

In one variation, the edge not only of the active shape element is selected during attachment, but so too is the edge of the additional shape element selected. This variation is beneficial when a given shape element has differences amongst its edges due to the given shape element being radially asymmetrical.

In one variation, the size of the additional shape element changes as the additional shape element is brought closer to a given edge of the active shape element, such that the additional shape element may increases in size, in a continuous fashion, as it approaches an edge of an active shape element larger than the selected edge of the additional shape element, and conversely decreases in size, in a continuous fashion, as it approaches an edge of an active shape element shorter than the selected edge of the additional shape element. This continuous increasing or decreasing in size occurs until the selected edges are brought together, whereafter the edges are presumed to be equivalent in length. The process resumes in the reverse if attachment of the edges is not finalized and the additional shape element is moved away from the active shape element.

A selected or tentatively selected edge may be highlighted or in otherwise graphically indicated until attachment or any other graphical manipulation transpires.

In one variation, the orientation of the additional shape element changes depending on which edge of the active shape element is selected or which edge of the active shape element is closest to the selected edge of the additional shape element. In particular, the change or orientation is such that the main bodies of the active and additional shape element elements will be on opposite sides of the selected/closest edges. Put more precisely, the orientation of the additional shape element changes so that the normal of the selected edge converges with the normal of the closest edge of the closest active shape element.

In one variation, proximity to an edge is determined by proximity to, specifically, proximity to a closest point along an edge. In another variation, proximity to an edge is determined by proximity to, specifically, proximity to either or both end points of an edge. In yet another variation, proximity to an edge is determined by proximity to, specifically, the midpoint of the edge. In an additional variation, proximity to an edge is determined by a weighted sum of multiple points along the edge. Each point may have two separate weights: a "distance" weight and a "significance" weight, with the distance weight being a relation to a distance between a given point on the first edge with (a) given point(s) on the second edge. Each point along an edge may have the same significance weight, or a greater significance weight may be assigned to the end points and/or the midpoint than to other points along the edge. One or more weights may be applied to points in a parenthetical, additional, subtractional, multiplicatory, divisional, and/or exponential manner. Proximity may be calculated based on the weighted sum, with the weighted sums of alternative edges compared in order to determine which edge is the most proximal.

In one variation, the orientation and size of an additional shape element is calculated based on the effect of a set of edges of an active shape element. The effect of the set of edges is a composite of the effects of each edge. The nature of the composite effect may be an averaging of the effects of the edges. The effect of each edge may take into account the distance between the edge of the active shape element and the edge of the additional shape element. The effect of each edge may also take into account properties intrinsic to the edge, such as its length, midpoint, normal, etc. The composite effect thusly described may be applied to an initial orientation and size of the additional shape element at the moment at which it is selected.

A more mathematically intensive description of changes in orientation and sizing may be found in the detailed description.

When attachment occurs and is finalized between two edges, the actual graphical distance between the two edges may be zero, based on the size of the work station, or based on edge measurements or other attributes that involve or relate to the sizing of the shape elements. The distance may be uniform with respect to all attachments, or calculated uniquely for each attachment. The distance may also be set by a user.

While a distinction above is made between active and additional shape elements, it is possible for both the active and additional shape element to be each positioned in the work station and therefore to both constitute "active shape elements". This is especially true after the additional shape element is attached to an active shape element.

The graphical tools accessed via the manipulation tool station may include a "multiplier" tool. The multiplier tool, upon selection, may display a series of numbers, with the numbers corresponding to a number of additional shape elements which will be attached to an active shape element. This is similar to the attachment (i.e., "simple attachment") described above, except that use of the multiplier tool (called "multiplication"), involves the selection of two edges ("start" and "stop" edges, also referred to as "primary" and "target" edges) of an active shape element, along with, in one variation, the passive (implied) selection of an angle between the two edges. Multiplication also differs from simple attachment, at least in one variation, in that the additional shape element elements and their edges are not selected, but instead, the active shape element is copied a number of times corresponding to the number selected from the series of numbers, with the copies attached iteratively such that the passively selected angle of the active shape element as well as the identical angles of the additional shape elements share a common vertex, with the stop edge of the active shape element or a first copy of the active shape element attaching to the start edge of a subsequent copy. Thus, the copies are placed adjacently such that all of the copies surround the common vertex. The start edge of the first copy attaches to the stop edge of the initial active shape element, and the start edge of the second copy attaches to the start edge of the first copy, etc. The stop edge of the N copy attaches to the start edge of the N+1 copy. The manipulation described here and the resulting cluster may be called "occupied-vertex multiplication" and "occupied-vertex cluster" respectively.

In one variation, the multiplier designation must be at least two, as the original unit is considered included in the multiplier. Thus, a multiplier of x will include the original unit being copied as well as the x−1 copies. In this manner, the number of copies may be said to correspond to the multiplier.

The series of numbers may also include an "all" option, which results in the creation of the maximum number of copies possible, considering the geometry of the shape elements and multiplication applied unto them. Thus, if the passively selected angle is 90 degrees, then because of the 360 degree attribute of a vertex, no more than three copies, in addition to the initial active shape element, can be utilized during multiplication.

In one variation, the start and stop edges do not have an angle in common, but are instead separated by an unselected edge. In this variation, multiplication results in the creation of a mere series of copies which attach at alternating start and stop edges. If the start and stop edges are parallel, then the resulting series of copies essentially constitute a line of copies of that active shape element. Such a cluster may be called a "line cluster". A line cluster is thus the result of "line multiplication". In line multiplication, there is no maximum number of copies necessitated geometrically due to the lack of a common vertex. Therefore, the "all" option will either be unavailable, or selection thereof will be set to a designated maximum set by the system platforms.

However, if the start and stop edges are not parallel, then the copies may (at least partly) surround a vertex, but unlike an occupied-vertex cluster, this surrounded vertex does not occupy the same graphical/spatial point as any angle of the active shape element, and may thus be called an "unoccupied-vertex cluster". The unoccupied-vertex cluster is thus the result of "unoccupied-vertex multiplication". Put differently, unoccupied vertex multiplication is the multiplication that occurs with respect to an active shape element having non-parallel start and stop edges which do not intersect at an angle of the active shape element itself—instead, intersection occurs if the start and stop edges are conceptually extended toward a vertex which does not form an angle of the active shape element.

If the start and stop edges are of unequal length, then the sizing of subsequent copies increases or decreases such that the start and stop edges of any prior and subsequent active shape element and/or copy are equalized. Thus, if the start edge is smaller than the stop edge, then each subsequent copy enlargens (creating a "geometric expansion cluster"), but if the start edge is greater than the stop edge, then each subsequent copy diminishes in size (creating a "geometric reduction cluster"). Consistent with the system platforms' treatment of line clusters, the system platforms may impose maximum and minimum edge lengths.

Shape elements that are attached may be referred to individually as active shape elements or collectively as a "cluster". Clusters may be treated similarly to active shape elements, and accordingly, wherever the term "shape element" is used herein, a cluster may be conceived in its place. Just as shape elements may undergo attachment and multiplication, so too may clusters undergo attachment and multiplication, with the cluster treated during the process as if it were a single indivisible shape element. Thus, the following attachments of clusters are possible: a. the attachment of an active shape element or first cluster to a second a cluster previously formed by the attachment of identical edges of identical shape elements; b. the attachment of an active shape element or first cluster to a second a cluster previously formed by the attachment of non-identical edges of identical shape elements; c. the attachment of an active shape element or first cluster to a second cluster previously formed by the attachment of non-identical shape elements; d. the multiplication of a cluster previously formed by the attachment of identical edges of identical shape elements; e. the multiplication of a cluster previously formed by the attachment of non-identical edges of identical shape elements; and f. the multiplication of a cluster previously formed by the attachment of non-identical shape elements.

Other graphical tools enabling graphical manipulation include: a copying tool, which enables an active shape element to be copied onto another location of the display space; an x-reflect or y-reflect tool, which enables an active shape element to be rotated about an x- or y-axis on a two dimensional plane of the display space; a z-reflect tool, which enables an active shape element to be rotated about a z-axis of the two-dimensional plane; a make-tile tool, which graphically consolidates a cluster such that the outlines separating the discrete active shape elements comprising the cluster disappear; and a make-brick tool, which operates similarly to the make-tile tool, except as will be described below. The resulting cluster onto which the make-tile tool was applied may be called a "tile", and the resulting cluster onto which the make-brick tool was applied may be called a "brick". A tile differs from a brick in that the edges of the active shape elements are conserved in the brick, such that attachment or multiplication may target the vestigial edges, whereas in a tile, the edges of active shape element are not conserved such that attachment or multiplication may only be applied to the new, replacement edges comprising the tile.

Another graphical tool includes a tangram tool, which reduces an active shape element, cluster, tile, or a brick to the outline of the same (a "tangram"), such that the same gain functional edges internal to the tangram. Put differently, the normals of edges in a tangram are duplicated, with the duplicate normal rotated 180 degrees toward the inside of the tangram (i.e., the directionality of the initial normal is reversed), thereby resulting in internal edges. Additional shape elements may be attached not only to the external edges but also to the resulting internal edges of the tangram. Thus, the tangram may be filled with additional shape elements attached to the tangram's internal edges.

Another graphical tool includes an add-edge tool, which enables the selection of two angles resulting in the creation of an edge spanning from the first angle to the second angle. The two angles may be part of a single active shape element, part of a cluster, or part of two separate active shape elements or clusters. Ideally, the "created-edge" forms an empty space between the created-edge and at least two edges adjacent to the selected angles. This created-edge may be subject to attachment and/or multiplication as previously described.

BRIEF DESCRIPTION OF THE DRAWINGS

Figure 1:
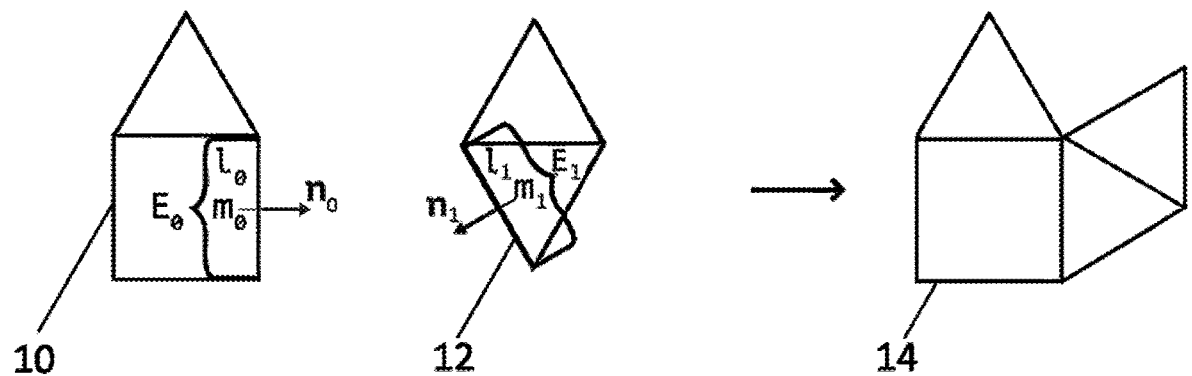
FIG. 1 shows the attachment of clusters.

As shown in FIG. 1, an additional shape element 12 is being attached to an active shape element 10. In particular, attachment is occurring via edge $E_0$ of the active shape element and edge $E_1$ of the additional shape element. Here, $E_0$ operates as the stop edge and $E_1$ operates as the start edge, such that the start edge of the additional shape element is being attached to the stop edge of the active shape element. The edges have lengths $L_0$ and $L_1$, midpoints $m_0$ and $m_1$, and normals $n_0$ and $n_1$, respectively—these parameters are used in calculating the orientation and sizing of the additional shape elements, as will be described below. Attachment of the active and additional shape elements may create a cluster 14.

Figure 2:
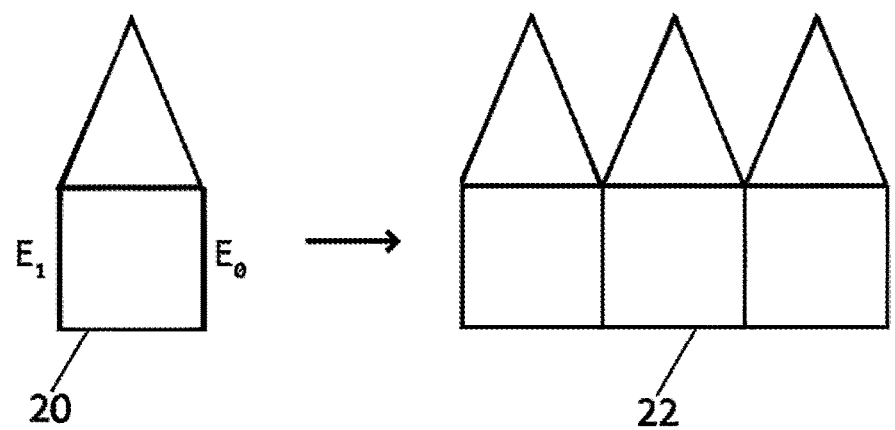
FIG. 2 shows the multiplication of a cluster via parallel edges.

As shown in FIG. 2, an active shape element 20 may undergo multiplication between two of its edges $E_0$ and $E_1$. As described above, multiplication involves creating copies of a shape element, and iteratively attaching the start edge of a subsequent unit to the stop edge of a prior unit. If the edges are parallel, then multiplication thereof may create a line cluster 22. Implicit but now shown is the designation of the multiplier. As there are three units in line cluster 22, which includes the original active shape element and two copies, it is implied that the multiplier is three.

Figure 3A:
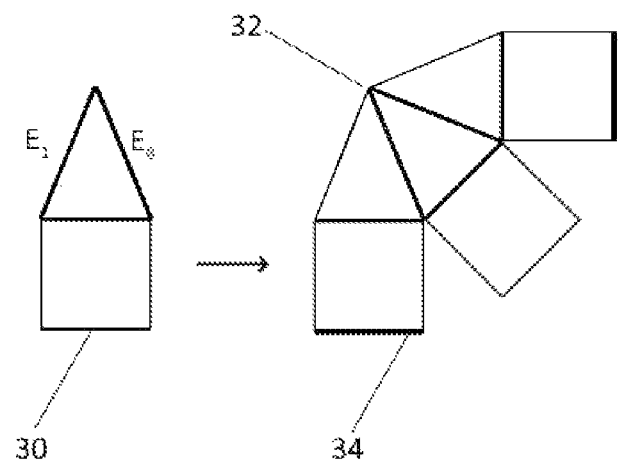
FIG. 3a shows the multiplication of a cluster via non-parallel edges

As shown in FIG. 3a, an active shape element 30 may undergo multiplication between two of its edges $E_0$ and $E_1$. If the edges are not-parallel, but intersect or meet at a common point 32, then multiplication yields an occupied-vertex cluster 34.

Figure 3B:
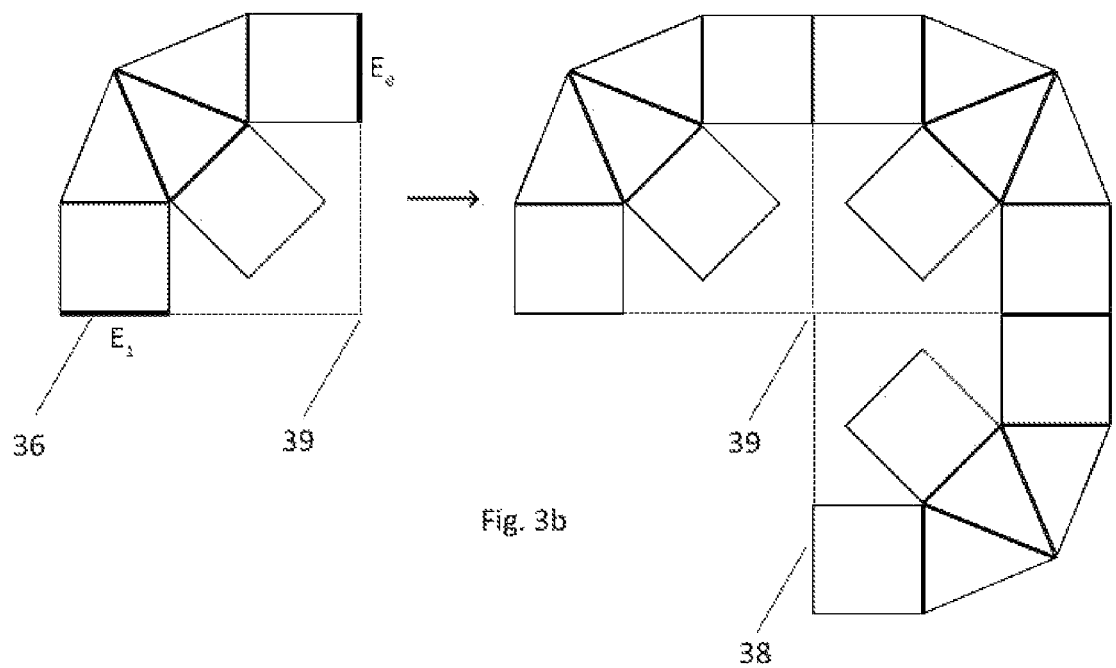
FIG. 3b shows the multiplication of a cluster via non-parallel edges.

As shown in FIG. 3b, an active shape element 36 may undergo multiplication between two of its edges $E_0$ and $E_1$. If the edges are not-parallel, and do not intersect or meet at a common point, then multiplication yields an unoccupied-vertex cluster 38. The unoccupied vertex would be the point of intersection 39 of edges $E_0$ and $E_1$, provided they were to be extended.

Figure 4A:
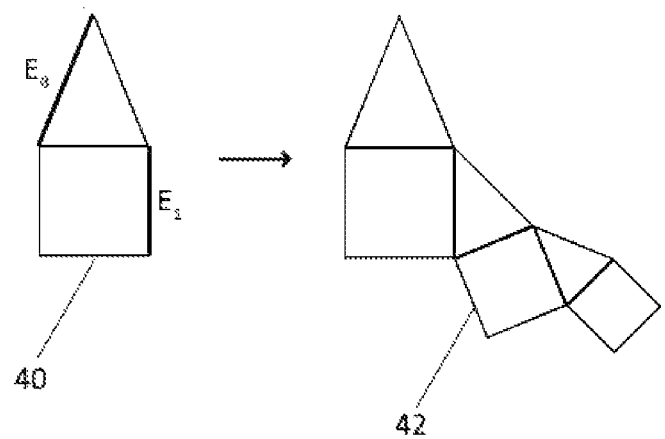
FIG. 4a shows the multiplication of a cluster via edges of non-equal length.
Figure 4B:
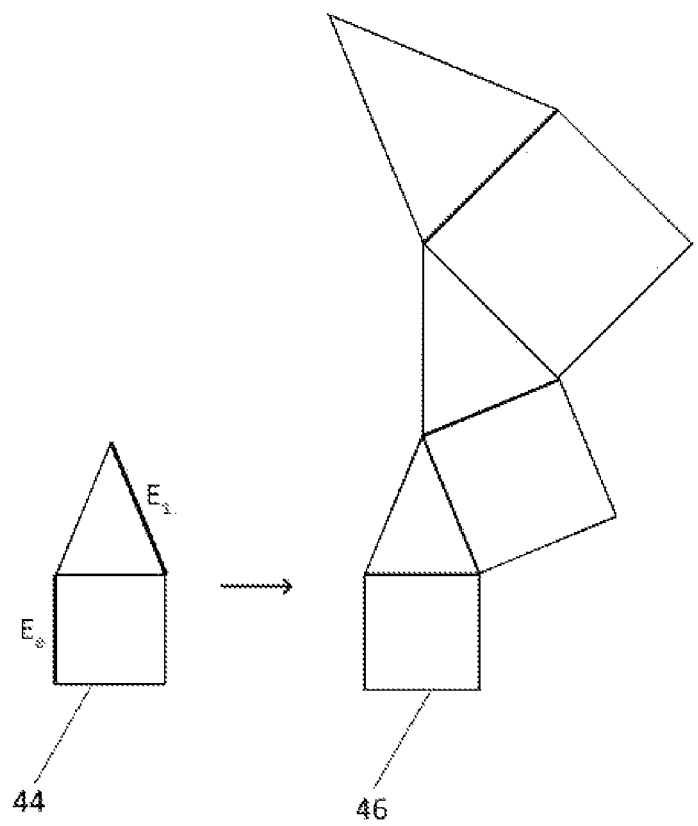
FIG. 4b shows the multiplication of a cluster via edges of non-equal length.

As shown in FIG. 4a, an active shape element 40 may undergo multiplication between two of its edges $E_0$ and $E_1$. If the edges are unequal in length, then the sizing parameter of each copy changes iteratively in order to force the edge lengths of $E_0$ and $E_1$ to match. As shown here, if the start edge is greater than the stop edge, then each subsequent copy diminishes in size, creating a geometric reduction cluster 42.

As shown in FIG. 4a, an active shape element 44 may undergo multiplication between two of its edges $E_0$ and $E_1$. If the edges are unequal in length, then the sizing parameter of each copy changes iteratively in order to force the edge lengths of $E_0$ and $E_1$ to match. As shown here, if the start edge is smaller than the stop edge, then each subsequent copy enlargens creating a geometric expansion cluster 46.

Figure 5:
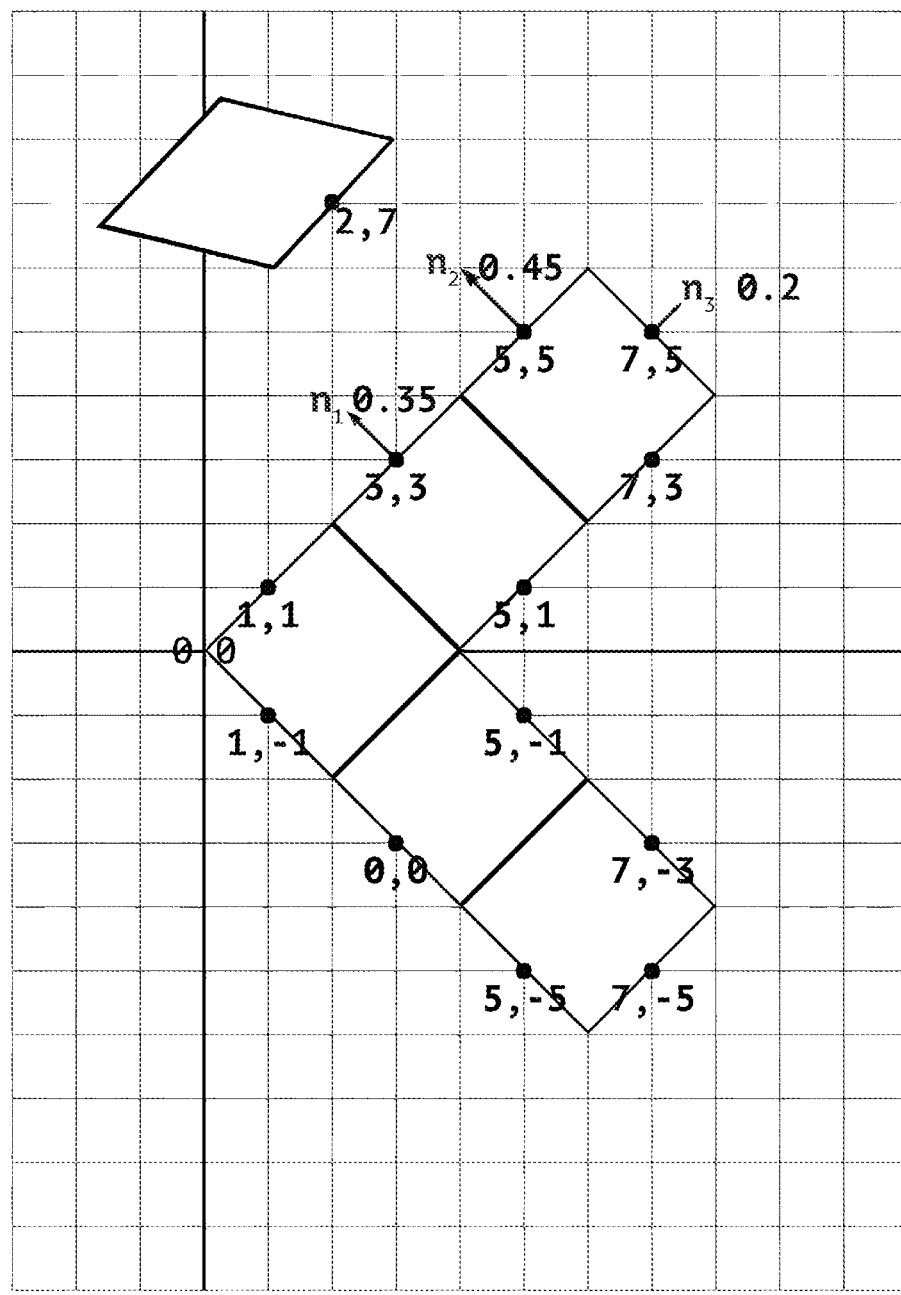
FIG. 5 shows the orientation of additional shape elements based on their proximity to various edges.

FIG. 5 shows how the coordinates of midpoints and the magnitude of normals of shape elements and clusters are established in a coordinate system. In addition, each free edge of the active shape element features coordinates of a midpoint, and several feature normal magnitudes. A free edge is one that does not already have an edge from some third shape element attached to it. As the additional shape element approaches the active shape element, all or a subset of the edges of the active shape, particularly the distance between their midpoints and the midpoint of the selected edge, may be used to determine the orientation of the additional shape element.

Figure 6:
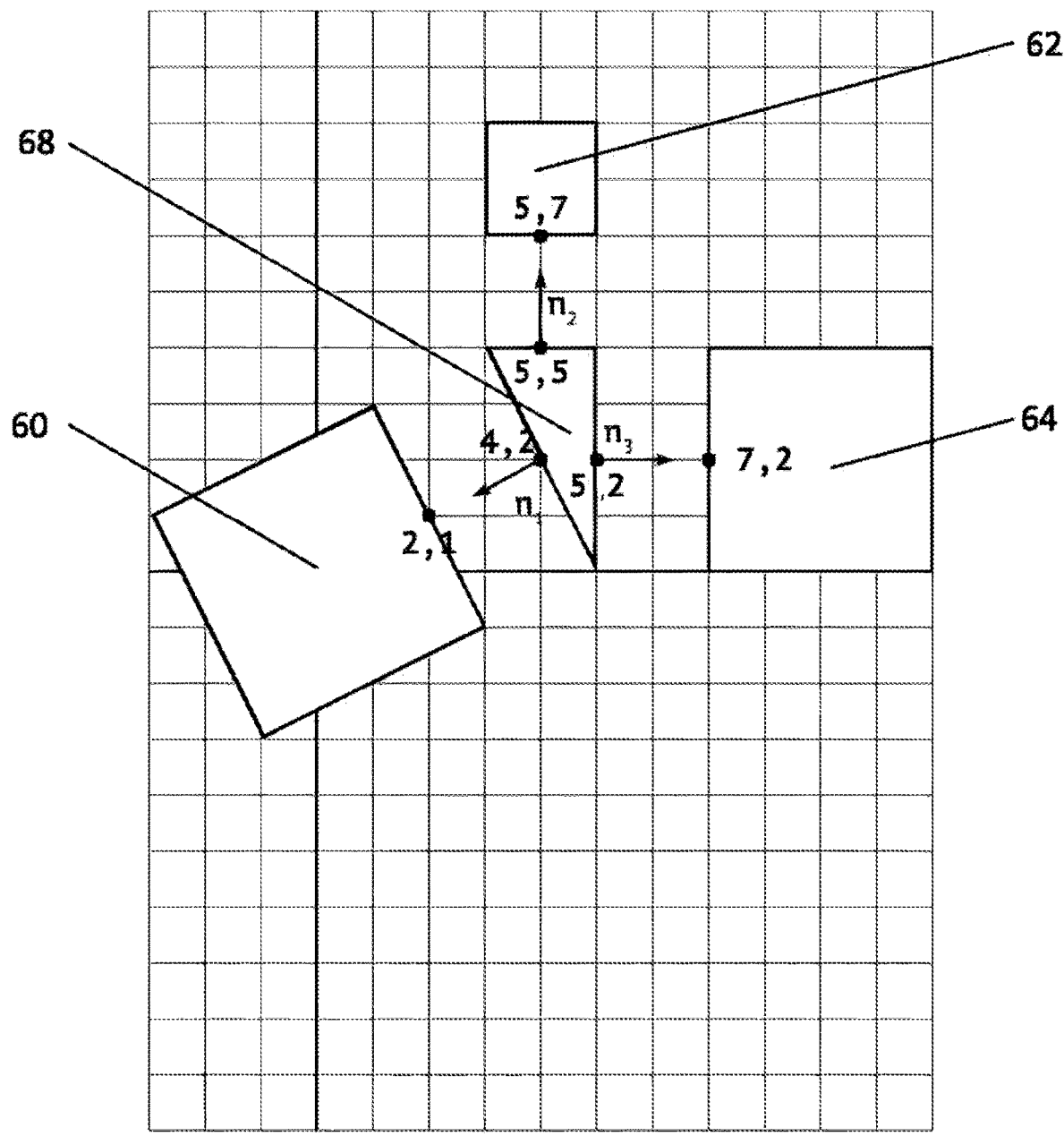
FIG. 6 shows the orientation and resizing of additional shape elements based on their proximity to various edges of unequal size.

FIG. 6 shows how a first shape element 60, 62, 64 will change in both size and orientation as it is moved around a second shape element 66 based on the length of the selected edge of the first shape element and the length of the edge of the second shape element to which it is closest.

Figure 7A:
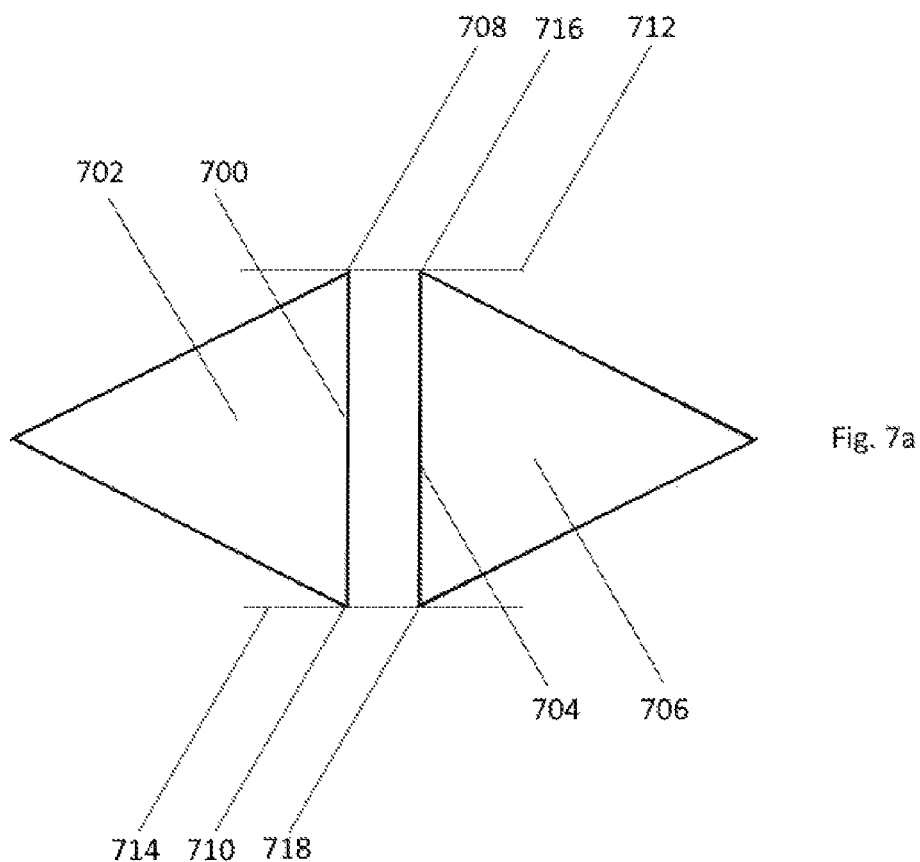
FIG. 7a shows the orientation and positioning of attached edges.
Figure 7B:
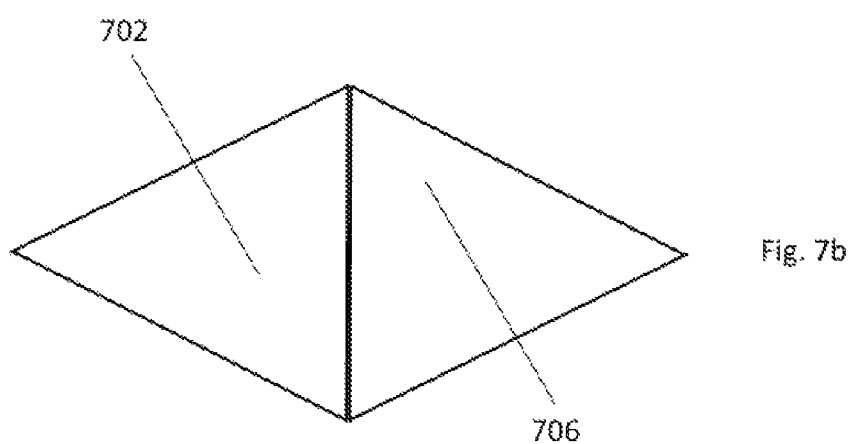
FIG. 7b shows the orientation and positioning of attached edges.

In one version, as shown in FIG. 7a, during attachment, the edge element 700 of an active shape element 702 and the edge element 704 of an additional shape element 706 converge or are at least temporarily fixed in parallel and such that two end points 708, 710 of the edge element of the active shape element fall on two lines 712, 714, and two end points 716, 718 of the edge element of the additional shape element fall on the same two lines, with the two lines each being perpendicular to both edge elements. In this variation, some distance remains between edges even after attachment. In another variation, as shown in FIG. 7b, the edge elements converge during attachment such that they appear to form a single line.

Figure 8:
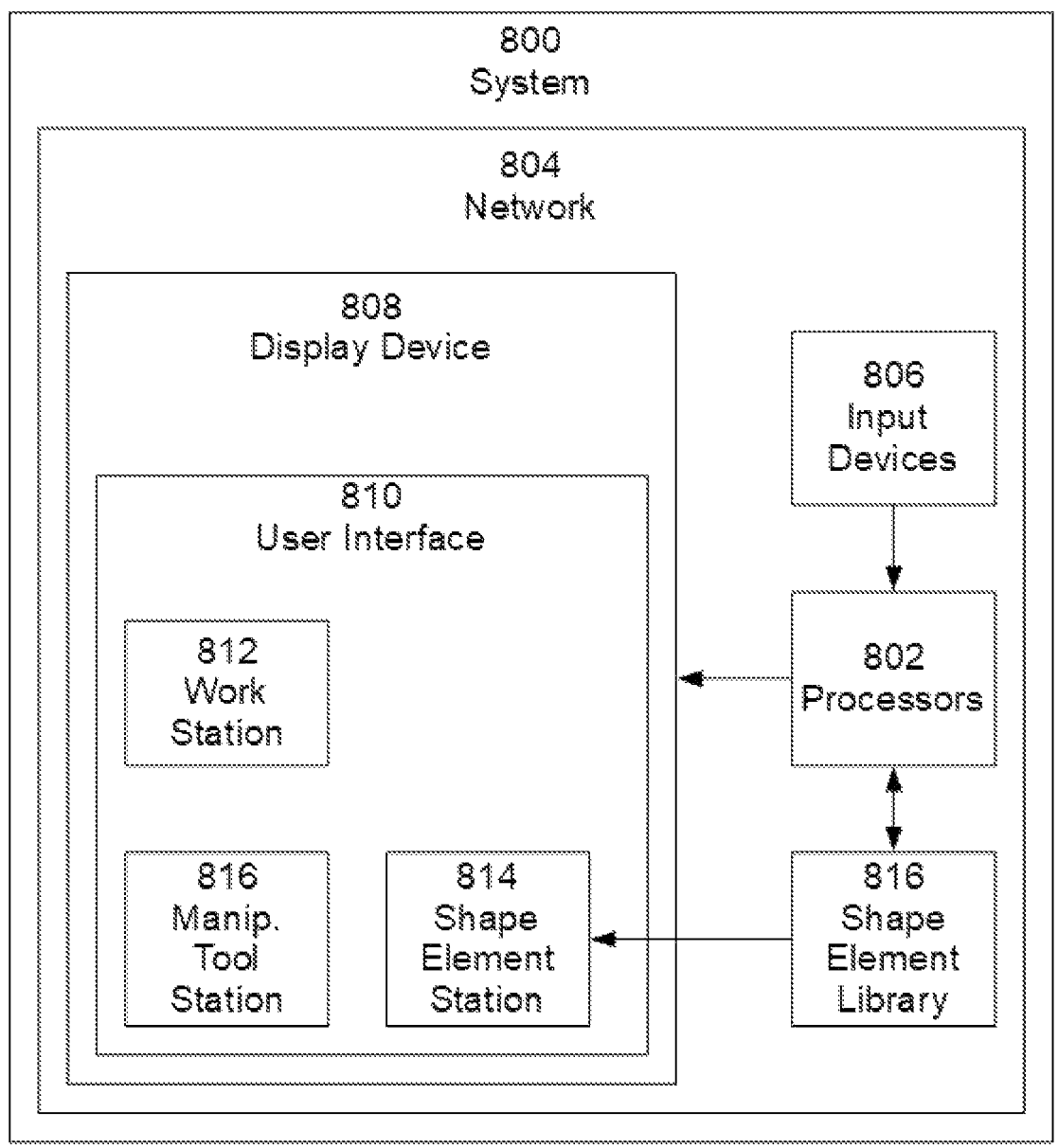
FIG. 8 shows an exemplary system.

FIG. 8 shows an exemplary system 800 comprising a set of processors or devices comprising processors 802 configured to operate over a network 804, a set of input devices 806, a display device 808, a user interface 810 configured to display on the display device and comprising a work station 812, a shape element station 814, and a manipulation tool station 816, and a shape element library 818 from which the shape element station receives shape elements.

The following descriptions provide an exemplary mathematical modeling behind edge manipulation. Although the term "cluster" is used hereafter in describing the mathematical modelling, the mathematically modelling may also describe shape elements that have not themselves been formed by the attachment or multiplication of other shape elements.

1. Joining Shape Elements Together.

Any pattern, onto which is applied any combination of rotations, shifts, and resizings, may be described as an affine transformation of the form $$x' = T(x) == \lambda Qx + t \quad (1.1)$$

$$\text{where } \lambda > 0 \quad (1.2)$$

and Q is a rotation matrix, which for some value of θ can be written as $$Q = \begin{pmatrix} \cos(\theta) & -\sin(\theta) \\ \sin(\theta) & \cos(\theta) \end{pmatrix} \quad (1.3)$$

Here x is the original position of a point in the pattern, and x' is the point that this gets mapped to.

As described in conjunction with FIG. 1, attaching an edge $E_1$ of an additional shape element $C_1$ (ref. 12) to an edge $E_0$ of an active shape element $C_0$ (ref. 10) may be accomplished by:

a. shifting the midpoint of $E_1$ to the midpoint of $E_0$. We will call this shifted edge E' b. resizing the edge E' so that it has the same length as $E_0$. We call this resized edge E".

c. rotating the edge E″ so that its normal vector is the negative of the normal to $E_0$.

The outcome of these steps is an affine transformation as in Eqn. (1.1) where $$\lambda = \frac{l_0}{l_1} \quad (1.4)$$

where $l_0$ and $l_1$ are the lengths of the edges $E_0$ and $E_1$. If the outward facing normals to $E_0$ and $E_1$ are given by $$\underline{n}_k = \begin{pmatrix} \alpha_k \\ \beta_k \end{pmatrix} \quad (1.5)$$

then we have $$Q = \begin{pmatrix} a & -b \\ b & a \end{pmatrix} \text{ where} \quad (1.6)$$

$$a = -(\alpha_0 \alpha_1 + \beta_0 \beta_1) \quad (1.7)$$

$$b = (\alpha_0 \beta_1 - \alpha_1 \beta_0) \quad (1.8)$$

If $m_k$, k=0, 1 is the midpoint of the edge Ex, then the vector t in Eqn. (1.1) is given by $$t = m_0 - \lambda Q m_1 \quad (1.9)$$

Now that we know the transformation in Eqn. (1.1), we apply it to all of the vertices and midpoints in the cluster.

2. Multiplying a Shape Element.

Multiplying a shape element by two is the same as joining edge $E_1$ of additional shape element $C_1$ to the edge $E_0$ of shape element $C_0$, where the shape elements $C_1$ and $C_0$ are the same shape element. If the shape element were multiplied by n, then n−1 shape elements are added to the shape element $C_0$, where the kth cluster is given by transforming the shape element $C_0$ using the transformation $$T_k = T^k \quad (2.1)$$

2.1 Automatic Multiply.

When multiplying a shape element, if the angle between two selected edges divides into 360 degrees an integral number of times, automatic multiply is enabled. For example, if the angle between the two edges is 30 degrees, the automatic multiply is the same as multiplying by 360/30=12. More generally, if the angle between the edges is 360/n, an automatic multiply is the same as multiplying by n.

Eqns. (1.6), (1.7) and (1.8) show how to determine the rotation matrix that rotates the first selected edge into the second selected edge. The angle $\theta$ between the edges satisfies $$\begin{pmatrix} \cos(\theta) \\ \sin(\theta) \end{pmatrix} = \begin{pmatrix} a \\ b \end{pmatrix} \quad (2.2)$$

and hence $$\theta = \text{atan2}(b, a) \quad (2.3)$$

where a tan 2 is the two argument arctangent function. To see if an automatic multiply is possible we compute $$N = \frac{360}{\theta} \quad (2.4)$$

If N is sufficiently close to an integer (for example: eight decimal places), we round N to the nearest integer and multiply by that amount.

3. Automatic Orientation of Shape Elements.

If there is an active shape element on a graphical work station, additional shape elements may automatically orient themselves when they are brought out onto the work station. As the selected edge of the additional shape element approaches an edge of the active shape element, the additional shape element rotates so that the selected edge becomes parallel to the edge of the active shape element. This may be achieved at least in part by factoring in not only a target edge, but a set of "free edges", including their midpoints, as shown in FIG. 5. In this section we explain how this rotation is accomplished.

Let $d_k$ be the distance from the midpoint of the selected edge to the midpoint of the kth free edge in the active shape element. Here a free edge is one that does not already have an edge from some third shape element attached to it. In order to avoid having to take a square root, we use the quantity $$s_k = \frac{1}{d_k^2} \quad (3.1)$$

We will use a weight $$w_k = f(s_k) \quad (3.2)$$

where $f(z)$ is an increasing function of z. In the code we use $f(z)=z$.

In describing an additional shape element being dragged around by one of its edges, let $E_0$ be the original edge of the additional shape element as it was initially set in the shape library, and $E_k$, k=1, q be the q closest free edges to the midpoint of the selected edge being dragging around. If there are less than q free edges, all of the free edges available may be used. Let $n_k$ be the normal to the kth edge. The weighted sum of all of these normals may may be computed using $$p = \frac{\sum_k w_k n_k}{\sum_k w_k} \quad (3.3)$$

This vector is not normalized, but can be normalized using $$n = \frac{p}{|p|} \qquad (3.4)$$

As the shape element is dragged around, the selected edge may be oriented so that its normal is pointing in the direction n.

If the distance from the midpoint of the selected edge being dragging to the midpoint of an edge $E_m$ is very small, then $s_m$ will be very large and p will be very close to nm. Initially, the selected edge will be close to the original edge of the additional shape element as it was initially set in the shape library, and hence will be oriented like the shape element in the shape library. Upon approached a given edge of an active shape element, the selected edge will orient in the direction of that given edge.

3.1 Scaling the Length.

When the selected edge of an additional shape element is being attached to an active shape element, the length of the selected edge changes as the additional shape element is moved around. This may be seen clearly in FIG. 6. As the selected edge approaches the target edge of the active shape element, the length of the selected edge approaches that of the target edge. As with the orientation, the length of the selected edge is determined by doing a weighted sum of the edge lengths $l_k$ of the free edges being used. In particular, the edge length l is given by $$l = \frac{\sum_k w_k l_k}{\sum_k w_k} \qquad (3.5)$$

The invention claimed is:

1. A system comprising a set of processors and a set of input devices, the set of processors programmed to:
    a. store a shape element database, the shape element database comprising a set of shape elements, with each shape element having a set of shape element parameters, the shape element parameters including a set of edge element for each shape element, a set of angle elements for each shape element, a sizing parameter for each shape element, and a set of arrangement data designating the arrangement of each edge element and each angle element for each shape element, with each edge element in the set of edge elements having a length, a midpoint, and a normal, with the normal having directionality;
    b. store an element manipulation database, the element manipulation database comprising a set of element manipulation scripts, with the set of element manipulation scripts including an attachment script and a multiplication script;
    c. receive a selection via the set of input devices of an edge element of a first shape element, an edge element of a second shape element, and the attachment script;
    d. then execute the attachment script, with the attachment script comprising the steps of:
        i. using arrangement data of the first and second shape elements, orient the second shape element so that:
            1. the directionalities of the normals of the edge elements of the first and second shape elements are opposing;
            2. the normals of the edge elements of the first and second shape elements converge;
            3. the edge elements of the first and second shape elements converge or are at least temporarily fixed in parallel and such that two end points of the first edge element fall on two lines and two end points of the second edge element fall on the same two lines, with the two lines each being perpendicular to both the first and second edge elements;
    e. receive a selection via the set of input devices of a first edge element of a third shape element, a second edge element of the third shape element, the multiplication script, and a multiplier;
    f. then execute the multiplication script, with the multiplication script comprising the steps of:
        i. creating a number of copies of the third shape element, with each copy of the third shape element having shape element parameters matching shape element parameters of the third shape element, with the number of copies corresponding to the multiplier;
        ii. arranging copies so that the second edge element of a copy undergoes attachment to the first edge element of the third shape element, and the first edge element of other copies undergoes attachment to the second edge element of another copy.

2. The system of claim 1, with the first and second shape elements being derived from the shape element database.

3. The system of claim 1, with at least one of the first and second shape elements being a cluster element, with cluster elements each being formed by attaching a plurality of shape elements.

4. The system of claim 1, with the third shape element being derived from the shape element database.

5. The system of claim 1, with the third shape element being a cluster element, with cluster elements each being formed by attaching a plurality of shape elements.

6. The system of claim 1, with the attachment script additionally comprising the steps of:
    a. if the length of the edge element of the second shape element is greater than the length of the edge element of the first shape element, then decrease the sizing parameter of the second shape element so that the length of the edge element of the second shape element is equal to the length of the edge element of the first shape element, but if the length of the edge element of the second shape element is less than the length of the edge element of the first shape element, then increase the sizing parameter of the second shape element so that the length of the edge element of the second shape element is equal to the length of the edge element of the first shape element.

7. The system of claim 1, with the attachment script additionally comprising the steps of:
    a. designate the first and second shape elements as forming a cluster element, with cluster elements each being formed by attaching a plurality of shape elements.

* * * * *